United States Patent
Oakley (10) Patent No.: US 6,633,642 B1
(45) Date of Patent: Oct. 14, 2003

(54) BALANCE NETWORK DIRECTIONAL COUPLER SYSTEM AND METHOD

(75) Inventor: Peter Q. Oakley, Clinton, WA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 09/310,010

(22) Filed: May 11, 1999

(51) Int. Cl.$^7$ .............................. H04B 1/58; H04M 3/22
(52) U.S. Cl. ..................................... 379/405; 379/27.01
(58) Field of Search ................................ 379/391, 392, 379/402, 403, 404, 405

(56) References Cited

U.S. PATENT DOCUMENTS

| 4,238,644 A | * | 12/1980 | Dijkmans et al. | ............ 379/413 |
| 4,380,690 A | * | 4/1983 | Matsufuji et al. | ............ 379/402 |
| 4,691,336 A | * | 9/1987 | Durston | ......................... 379/21 |

OTHER PUBLICATIONS

Greene, J.D., Gross, C.A., Nonlinear modeling of transformers IEEE Transactions on Industry Applications, vol. 24 Issue 3 pp. 434–438, May–Jun. 1988.*
Chen, Walter Y., *DSL: Simulation Techniques and Standards Development for Digital Subscriber Line Systems*, Macmillan Technical Publishing, Indianapolis, IN, 1998, p. 94.

* cited by examiner

Primary Examiner—Forester W. Isen
Assistant Examiner—Daniel Swerdlow
(74) Attorney, Agent, or Firm—Dorsey & Whitney LLP (57) ABSTRACT

A balance network directional coupler (BNDC) allows for effective coupling to sources of transmitted signals, communication lines, and devices that process received signals. The BNDC includes a transmission port, first and second amplifiers, a reception port, a communication line port, a transformer system, and a balance network. The second amplifier has a second gain of a polarity opposite the polarity of the polarity of the first gain. The transformer system has first and second windings each having first and second terminals, the first and second terminals of the first winding being electrically coupled to the communication line port, the first terminal of the second winding being electrically coupled to the reception port, and the second terminal of the second winding being electrically coupled to an output terminal of the second amplifier. The second winding of the transformer system has an equivalent impedance at the first and second terminals based on an impedance of the transformer system and an impedance of a communication line. The balance network is electrically coupled to an output terminal of the first amplifier and to the reception port. The balance network is configured to have an impedance relative to the equivalent impedance at the second winding of the transformer system selected so that the reception port is substantially decoupled from the transmission port.

22 Claims, 12 Drawing Sheets

Fig. 14

BALANCE NETWORK DIRECTIONAL COUPLER SYSTEM AND METHOD

TECHNICAL FIELD

The present invention relates to a directional coupler system and, more particularly to a balance network directional coupler system.

BACKGROUND OF THE INVENTION

Testing of communication lines, such as telephone lines and network cables is a vital function for operation of communication systems. Typically, testing involves determining the operational status of a communication line. For instance, for a twisted pair telephone line, operational status would include the length of the twisted pair line, the number and location of any taps or splices on the line, and the level of attenuation that the line imposes upon a communication signal traveling across the line.

To determine operational status of a communication line, test equipment is typically placed on both ends of the line. In the case of a twisted pair telephone line, one end is generally located at a central office site, and the other end is usually located either at a residential or commercial establishment. Prior art dual-ended testing systems and methods that use testing equipment on both ends of a communication line are inherently more costly and logistically complex to implement than a single-ended testing system that requires testing equipment on only one end of a communication line. However, prior art systems have focused on dual-ended testing rather than single-ended testing because of difficulties imposed by single-ended testing.

Many of the difficulties of single-ended testing relate to the loss of signal quality due to its travel in two directions along a communication line. Another problem with single-ended testing involves transmission signals interfering with reception signals. In single-ended testing, both a transmitter and a receiver are located at the same end of a communication line. As a result, a first signal transmitted from a first end may be reflected back to the first end. If a second signal is transmitted near the time that the first signal is received at the first end, interference with reception of the first signal may result.

Prior art attempts to reduce this type of interference has resulted in devices commonly referred to as directional couplers. In general, a directional coupler isolates transmitted signals sent on a communication line at one end of the line from signals received at the same end of the communication line. A directional coupler generally includes a transmission port that is coupled to a signal transmitter that generates signals to be transmitted on to the communication line. The transmission port also includes an amplifier section which amplifies the signals to be transmitted. A directional coupler also generally includes a communication line port that is coupled to the communication line being tested to both pass the signals to be transmitted on to the communication line and to receive reflected signals. The communication line port also generally includes transformers to assist in passing the signals to be transmitted on to the communication line. A directional coupler further includes a receiver port that is coupled to processing devices that process the reflected signals received at the communication line port of the directional coupler.

Prior art directional couplers have only been partially successful in isolating transmitted signals from received signals. This partial success has been due to several factors, including port designs that unduly alternate test signals and burdensome requirements for multiple transformers. This has resulted in less than desirable quality for various tests of communication lines and added weight and bulk of testers.

SUMMARY OF THE INVENTION

A balance network directional coupler in accordance with the invention allows for effective coupling to sources of transmitted signals, communication lines, and devices that process received signals. The balance network directional coupler includes a transmission port, first and second amplifiers, a reception port, a communication line port, a transformer system, and a balance network. The first amplifier has a first gain of one polarity, the first amplifier also has an output terminal and an input terminal electrically coupled to the transmission port. The second amplifier has a second gain of a polarity opposite the polarity of the polarity of the first gain. The second amplifier also has an output terminal, and an input terminal electrically coupled to the transmission port.

The transformer system has first and second windings each having first and second terminals, the first and second terminals of the first winding being electrically coupled to the communication line port, the first terminal of the second winding being electrically coupled to the reception port, and the second terminal of the second winding being electrically coupled to the output terminal of the second amplifier. The second winding of the transformer system has an equivalent impedance at the first and second terminals based on an impedance of the transformer system and an impedance of a communication line.

The balance network has first and second terminals, the first terminal of the balance network electrically being electrically coupled to the output terminal of the first amplifier, the second terminal of the balance network being electrically coupled to the reception port. The balance network is configured to have an impedance relative to the equivalent impedance at the second winding of the transformer system selected so that the reception port is substantially decoupled from the transmission port. In a further aspect the ratio between the magnitude of the first gain to the magnitude of the second gain is substantially equal to the ratio of the impedance of the balance network to the equivalent impedance at the second winding of the transformer.

As is conventional in the field of electrical circuit representation, sizes of electrical components are not drawn to scale, and various components are enlarged or reduced to improve drawing legibility. Component details have been abstracted in the figures to exclude detail such as position of components and precise connections used between components.

DETAILED DESCRIPTION OF THE INVENTION

In the following description, numerous specific details are provided, such as specific configuration of the apparatus, circuit components, particular communication lines tested, and specific tests conducted, etc., to provide a thorough understanding of the embodiments of the invention. One skilled in the relevant art, however, will recognize that the invention can be practiced without one or more of the specific details or with other processes, configurations, hardware, etc. In other instances, well-known structures or operations are not shown or described in detail to avoid obscuring the description of the embodiments.

Figure 1:
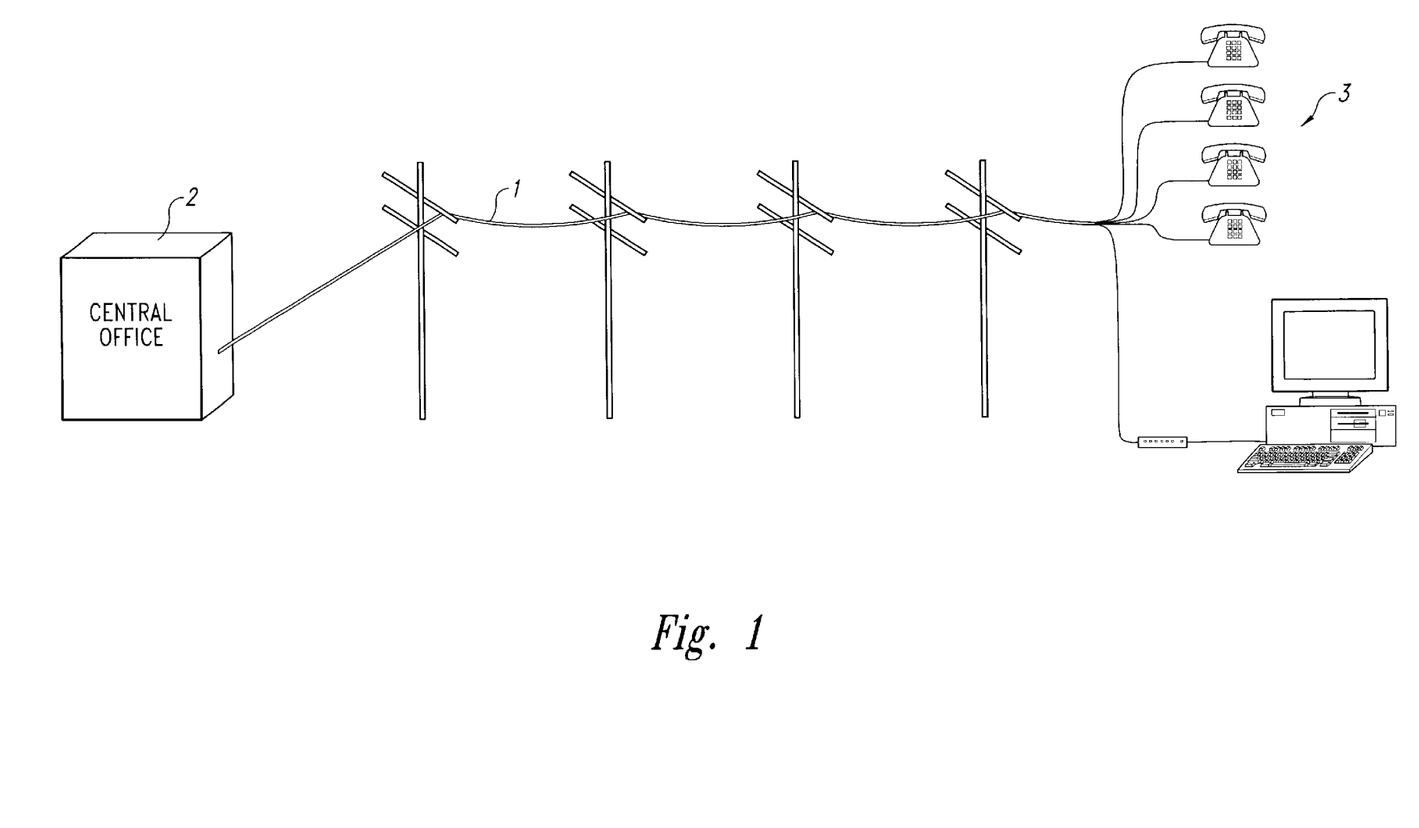
FIG. 1 is a schematic diagram illustrating a test environment in which an embodiment of the invention may be used.
Figure 2:
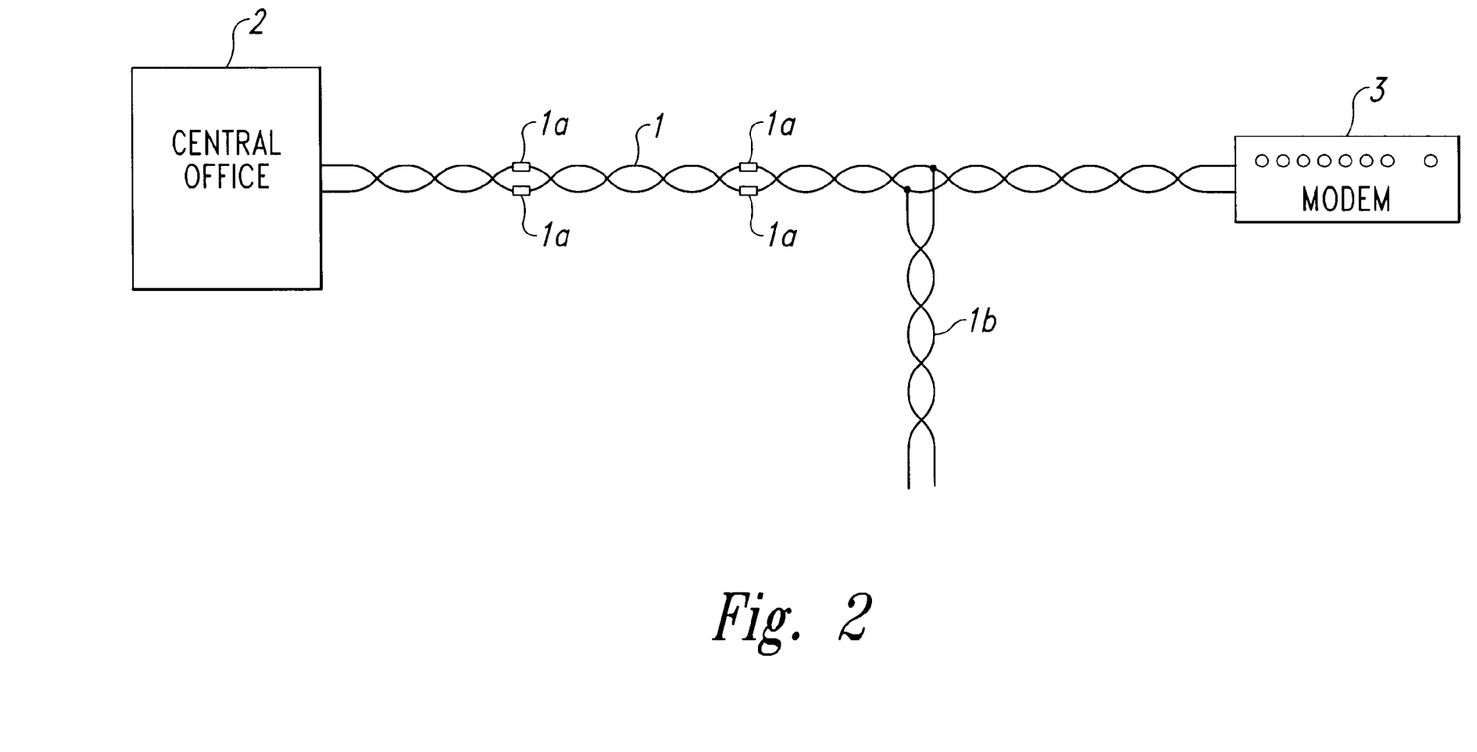
FIG. 2 is a schematic diagram further illustrating the test environment of FIG. 1 showing a twisted pair communication line.

With reference to FIGS. 1 and 2, one embodiment of the invention is configured to test a twisted pair communication line 1 originating at a central office 2 and terminating at end user devices 3 such as telephones or computer modems. The twisted pair communication line 1 may include splices 1a and bridge taps 1b, as illustrated in FIG. 2. The twisted pair line 1 is generally used by telephone companies to provide both voice and data communication services. The length of a typical twisted pair line 1 can extend up to as long as 30,000–50,000 feet with an average of 22 splices 1a in the twisted pair line.

Since the distance between the central office 2 and the end user devices 3 can be quite significant, single-ended testing of the twisted pair line 1 is preferred over systems and methods requiring test equipment for both ends of the twisted pair line. In the past, communication services utilizing twisted pair lines have not been as demanding as newly emerging services such as asymmetric digital subscriber line (ADSL) service. Long-established services, such as voice quality phone service, typically has a 0 to 4 kilohertz frequency requirement that most twisted pair lines readily fulfilled. The newly emerging services, on the other hand, place much greater demands upon the twisted pair line 1. For instance, ADSL uses a 26 kilohertz to 1.1 megahertz bandwidth.

For testing of twisted pair lines 1 for voice quality phone service, a time domain reflectometer (TDR) test would often be sufficient in many circumstances. A TDR test is a single-ended test that helps technicians determine location of things such as splices 1a, bridge taps 1b, and the overall length of the twisted pair line from the central office 2 to the end user device 3. Dual-ended testing has been used to measure noise and attenuation characteristics of the twisted pair line, such as attenuation levels, noise levels, and signal-to-noise ratios. These dual-ended tests typically use broad band signals to obtain measurements related to a frequency spectrum of the test signals.

For the newly emerging services, noise and attenuation characteristics of the twisted pair line 1 have taken on much greater significance. Due to the greater bandwidth requirements, operational performance of the newly emerging services is highly sensitive to noise and attenuation characteristics. Yet, prior art test systems and methods remain dependent upon dual-ended testing of noise and attenuation characteristics that has greater logistical demands and potentially higher operations and equipment costs compared with single-ended testing.

To address this need for better test equipment to accommodate the newly emerging services, the depicted embodiment is utilized in signal-ended test equipment that utilizes both TDR measurement techniques and other techniques associated with obtaining attenuation, noise, signal-to-noise ratios, and other characteristics of the twisted pair line 1. Other embodiments of the invention are used along with dual-ended test systems and methods that include transmission and reception of signals at one end of a communication line either in conjunction with or in addition to dual-ended tests. Further embodiments involve testing coaxial cable and fiber optic cable.

Figure 3:
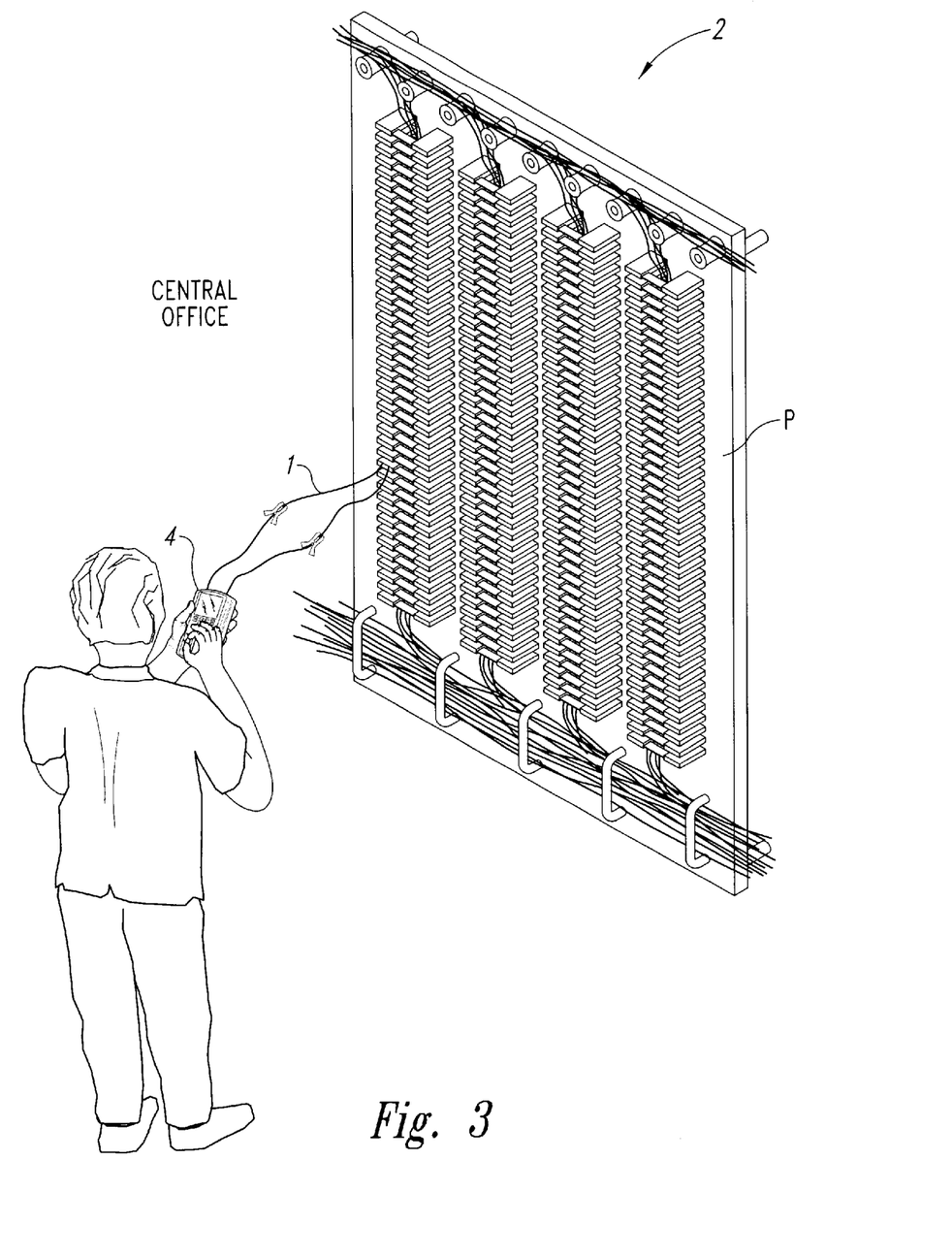
FIG. 3 is an isometric view further illustrating the test environment of FIG. 1 at a central office location.
Figure 4:
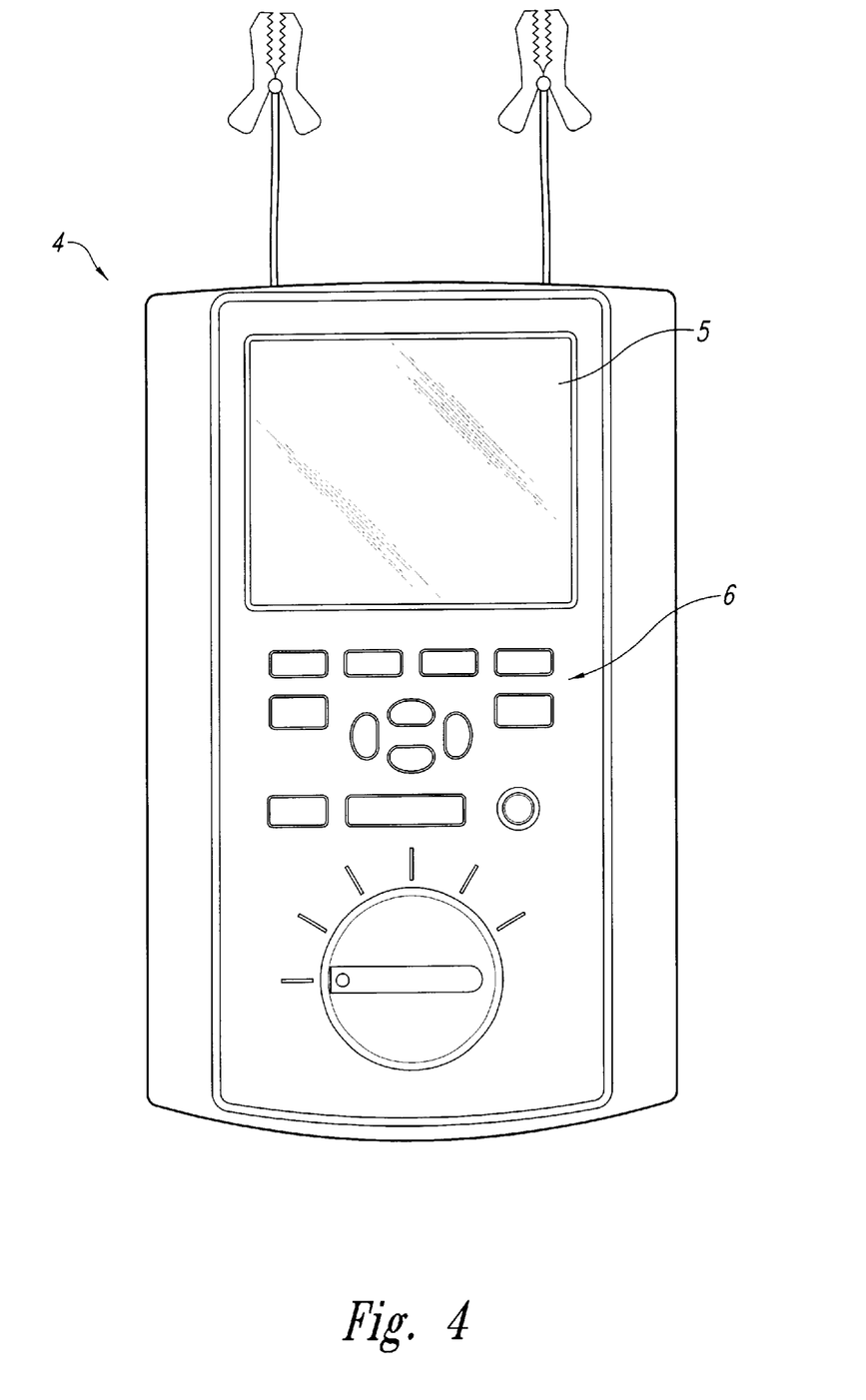
FIG. 4 is a top plan view showing an embodiment of a test apparatus in accordance with the invention.
Figure 5:
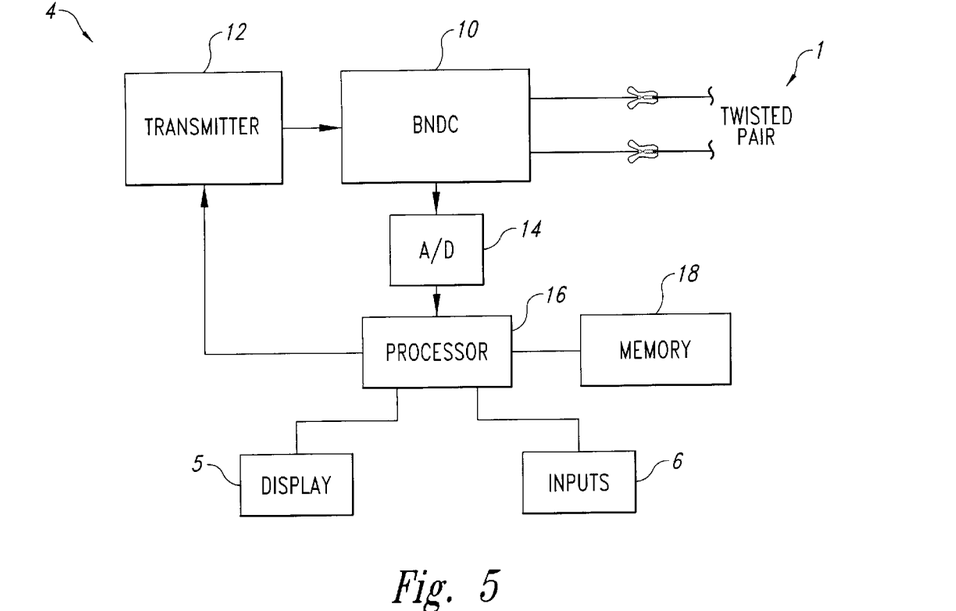
FIG. 5 is a block diagram of a test apparatus according to an embodiment of the invention.

One embodiment of the invention is shown in FIGS. 3 and 4 and is schematically represented in FIG. 5. The line tester 4 is shown in FIG. 3 in use at a central office 2 coupled to a twisted pair line 1 through a terminal panel P. With reference to FIG. 4, the line tester 4 includes a display 5 and various operating keys 6.

The components of the line tester 4, including a balanced network directional coupler ("BNDC") 10, and illustrated in FIG. 5. The BNDC 10 amplifies test signals received from a signal transmitter 12 to be transmitted on the twisted pair line 1. The BNDC 10 routes reflected signals received from the twisted pair line 1 to an analog-to-digital (AID) converter 14. The A/D converter 14 digitizes the received signals from the BNDC 10 to processor 16 and stored in a memory 18 to be subsequently analyzed. The processor 16 also initiates the test signals by sending control pulses to the transmitter 12.

Figure 6:
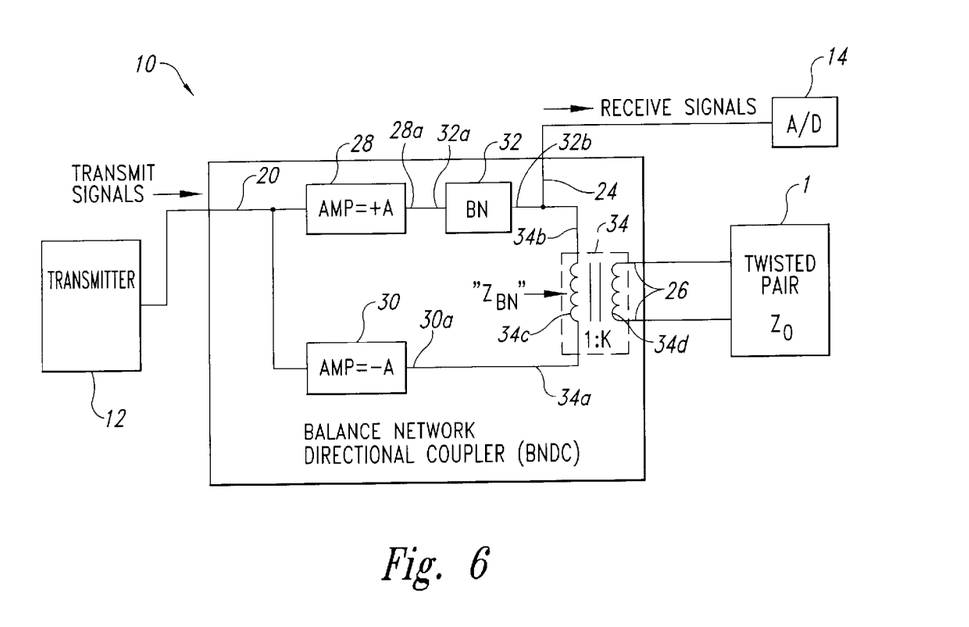
FIG. 6 is a partial block and partial schematic diagram illustrating the test apparatus embodiment of FIG. 5.

The BNDC 10 is shown in greater detail in FIG. 6. The BNDC 10 includes a transmission port 20, a reception port 24, and a communication line port 26. The BNDC 10 uses a non-inverting amplifier 28 having an output 28a, and an inverting amplifier 30 having an output 30a to amplify signals received through the transmission port 20. However, the amplifiers 28 and 30 have approximately the same magnitude of gain. The received signals amplified by the amplifier 28 are coupled through a balance network 32 to a terminal 34b of a transformer system 34. The balance network 32 has an impedance at its terminals 32a, 32b that is substantially matched to the combined impedance $Z_{BN}$ of the transformer system 34 and the twisted pair line 1 at terminals 34a, 34b. In the depicted embodiment, the transformer system 34 has first and second windings 34c, 34d and has a step-up ratio of K greater than one. The transformer system in some embodiments includes either single core or dual core configurations and other embodiments include other core configurations. Other embodiments include ratios of K less than or equal to one. Additional embodiments may include multiple transformers. Depending upon the particular embodiment, the first and second windings 34c, 34d will vary accordingly. Further embodiments include additional electrical devices located between the terminals 28a, 32a; the terminals 32b, 24; the terminals 24, 34b; and/or located between the terminals 30a, 34a. Also, additional electrical devices may be located internal to the transformer system 34 affecting the combined impedance $Z_{BN}$ of the transformer system 34 and twisted pair line 1. The additional electrical devices have additional impedances that are factored into determination of the impedance of the balance network 32 so that, in general, the impedance at the terminals 28a, 24 is substantially matched to the impedance at the terminals 24, 30a.

Figure 7A:
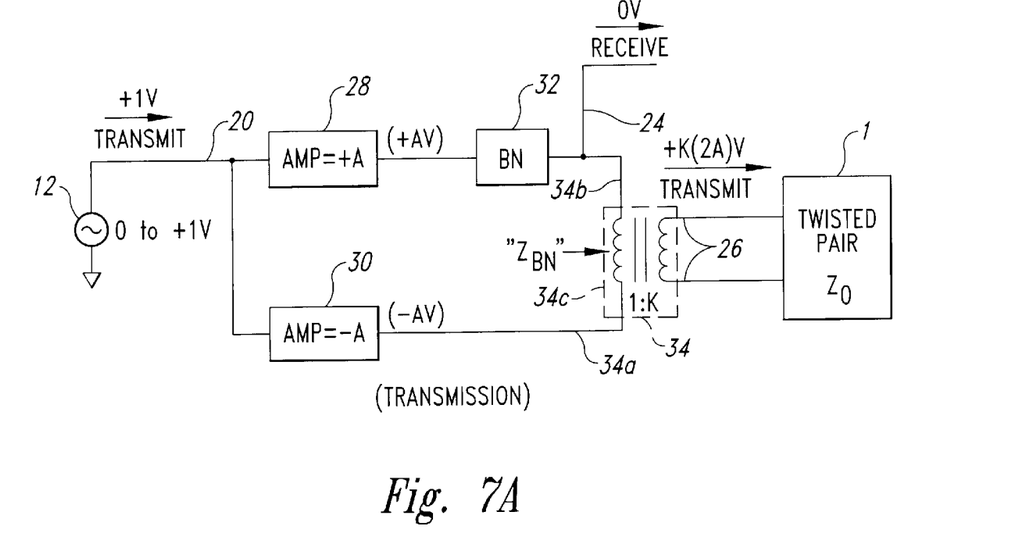
FIGS. 7A and 7B are partial block and partial schematic diagrams of the test apparatus embodiment of FIG. 6 showing the level of signals present in the test apparatus.

The operation of the BNDC 10 can best be explained with reference to FIG. 7A in which it is assumed a +1 volt signal is being generated by the transmitter 12. The amplifier 28 will then output of signal of +A volts, while the amplifier 30 will output of signal of −A volts, where A is the gain of the amplifiers 28, 30. The balance network 32 and the transformer coupled to the twisted pair line 1 form a voltage divider between the respective outputs 28a, 30a of the amplifiers 28, 30, with the reception port 24 forming the output of the voltage divider. Since the impedance of the balance network 32 is substantially equal to the combined impedance $Z_{BN}$ of the transformer 34 and the twisted pair line 1 at the terminals 34a, 34b, the voltage at the reception port 24 will remain at zero volts. Thus, substantially none of the signal generated by the transmitter 12 is coupled to the reception port 24. Instead, a signal with an amplitude of +K(2A) volts will be transmitted onto the twisted pair line 1. The BNDC 10 thus isolates and decouples the signal generated by the transmitter 12 from the A/D converter 14 (FIG. 1).

In other embodiments of the invention, the absolute values of the gains of the amplifiers 28 and 30 are different, so the impedance for the balance network 32 is selected based on the amplifier gains as well as the combined impedance $Z_{BN}$ at the terminals 34a,b of the transformer 34 and the twisted pair line 1. As a result, the voltage at the reception port 24 remains at zero volts as the transmitter 12 couples signals to the amplifiers 28, 30. More specifically the ratio between the magnitude of the gain of the amplifier 28 to the magnitude of the gain of the amplifier 30 should be substantially equal to the ratio of the impedance of the balance network 32 to the combined impedance $Z_{BN}$ at the terminals 34a,b of the transformer 34 and twisted pair line 1.

In general, for further embodiments with additional electrical devices discussed above, the ratio between the magnitude of the gain of the amplifier 28 to the magnitude of the gain of the amplifier 30 should be substantially equal to the ratio of the impedance at the output terminal 28a of the amplifier 28 and the reception port 24 to the impedance at the output terminal 30a of the amplifier 30 and the reception port 24. The impedance at the output terminal 28a of the amplifier 28 and the reception port 24 includes the impedance of the balance network 32 at the terminals 32a,b and the impedance of any additional electrical devices between the terminals 28a, 32a and/or the terminals 32b, 24. The impedance at the output terminal 30a of the amplifier 30 and the reception port 24 includes the combined impedance $Z_{BN}$ at the terminals 34a,b of the transformer 34 and twisted pair line 1, and the impedance of any additional electrical devices between the terminals 30a, 34a and/or the terminals 24, 34b.

Typically in the context of a single-ended test, a signal received from the twisted pair line 1 through the communication line port 26 results from a signal first being transmitted from the communication line port onto the twisted pair line 1 and being reflected somewhere along the twisted pair line back to the communication line port. Mid-point reflections occurring between ends of the twisted pair line 1 are typically caused by splices 1a (FIG. 2) or bridge taps 1b. Mid-point reflections are distinguished from end-point reflections occurring at the end of the twisted pair line 1 opposite the line tester 4.

Figure 7B:
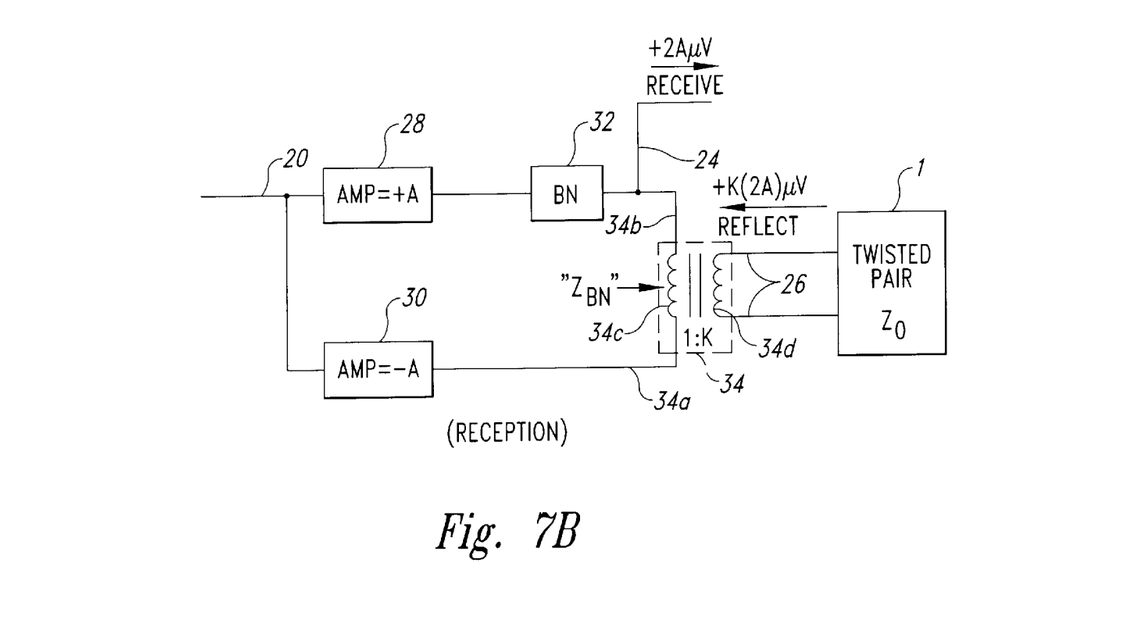

The operation of the BNDC 10 responsive to signals received from the twisted pair line 1 through the communication line port 26 will now be explained with reference to FIG. 7B. A signal having a magnitude of +K(2A) microvolts is received from the twisted pair line 1 on the communication line port 26. Since the transformer system 34 has a turns ration of 1:K, the received signal is applied to the reception port 24 with a signal level reduced by 1/K.

Figure 8A:
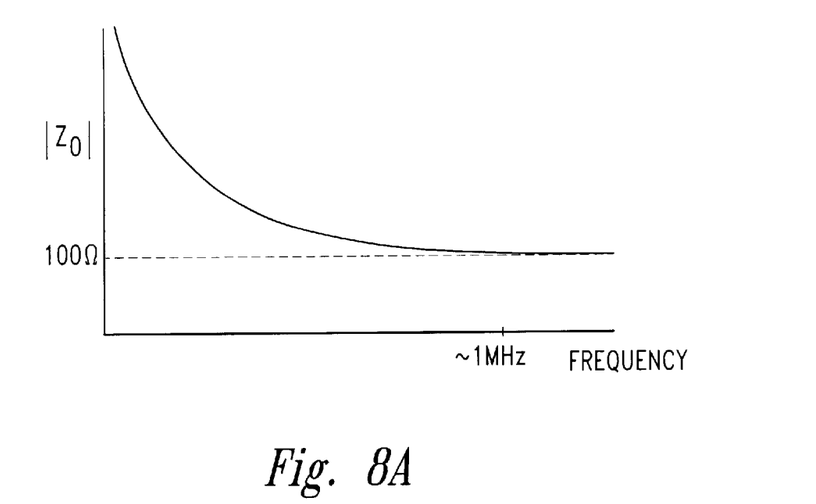
FIGS. 8A and 8B are graphs illustrating impedance and associated phase characteristics, respectively, with respect to frequency of a signal carried by a typical twisted pair communication line to be tested by a test apparatus according to an embodiment of the invention.
Figure 8B:
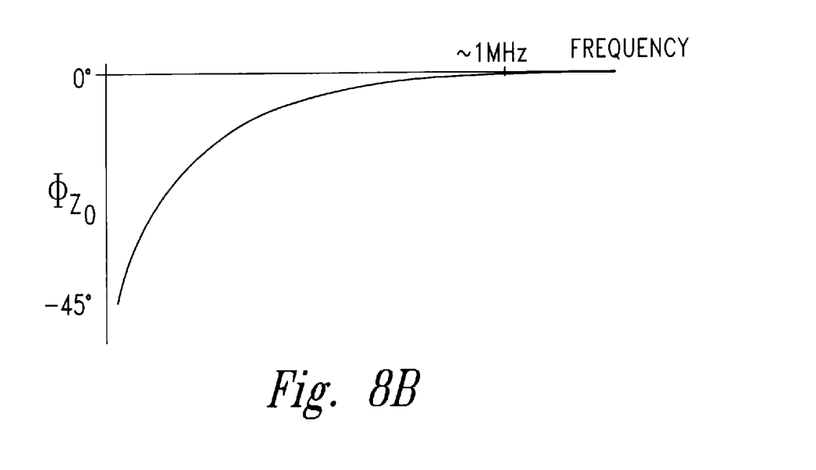

The balance network 32 is designed so that its impedance matches the characteristic impedance of the twisted pair line 1 as coupled through the transformer system 34 over a range of frequencies of interest. The magnitude and phase of the characteristic impedance for the twisted pair line 1 are shown in FIGS. 8A and 8B, respectively. For twisted pair lines of typical length used in communication services, for signals having frequencies above 1 megahertz, the impedance $Z_O$ of twisted pair lines is approximately 100 ohms. The impedance $Z_O$ of twisted pair lines increases as the frequency or frequency components of signals transmitted over the twisted pair lines becomes much less than 1 megahertz, as shown in FIG. 8A. As the frequency or frequency components of signals approaches 25 kilohertz, the lower limit of the ADSL service, the characteristic impedance $Z_O$ of a twisted pair line 1 is substantially greater than 100 ohms. Also, as frequency or frequency components of signals sent over twisted pair lines decreases, the phase of the twisted pair line impedance decreases from 0° to approaching −45°, as shown in FIG. 8B.

Figure 9A:
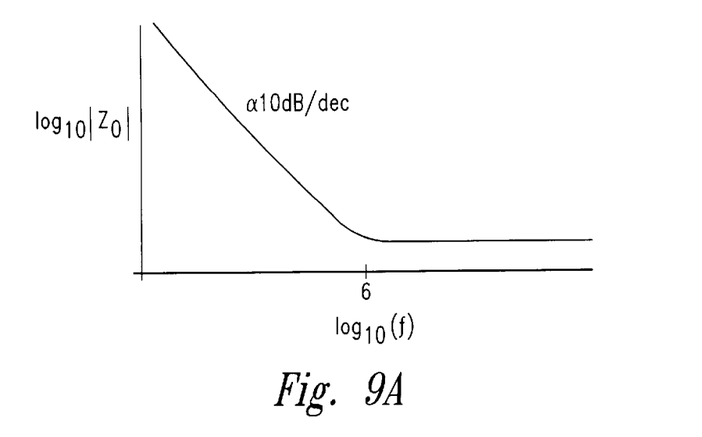
FIGS. 9A, 9B and 9C are Bode plots of impedance and phase characteristics of the twisted pair communication line further illustrating techniques used to determine component values of the test apparatus embodiment of FIG. 6.
Figure 9B:
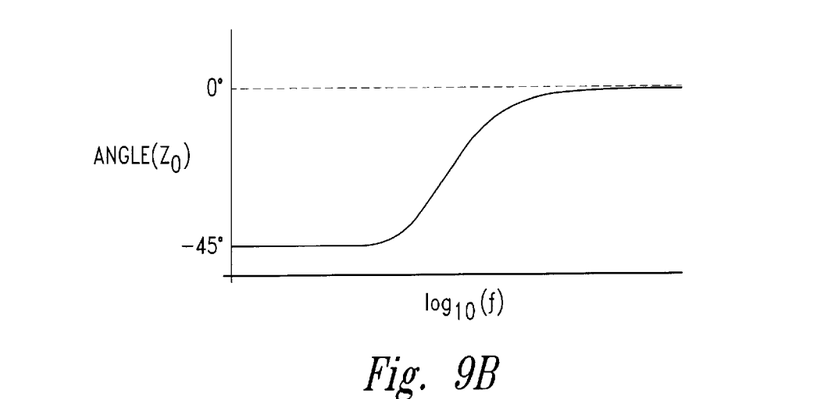

The magnitude and phase of the characteristic impedance of the twisted pair line 1 shown in FIGS. 8A and 8B can be approximated by the graphs shown in FIGS. 9A and 9B, respectively, which can be modeled by circuitry designed with the use of RC Network Synthesis, well known in the art. Techniques used with RC Network Synthesis such as found in "Network Analysis and Synthesis," Second Edition, Franklin F. Kuo, 1966, Section 11.4, use functions, F(s), of complex variables, s, where s=a+jb. The typical expression used to model frequency response of the generalized impedance $Z_O$ of twisted pair lines includes poles and zeroes as follows.

$$Z(s) = \frac{B(s - zero_1)(s - zero_2)(s - zero_3)(s - zero_4)(s - zero_5)}{(s - pole_1)(s - pole_2)(s - pole_3)(s - pole_4)(s - pole_5)} \quad (1)$$

Figure 9C:
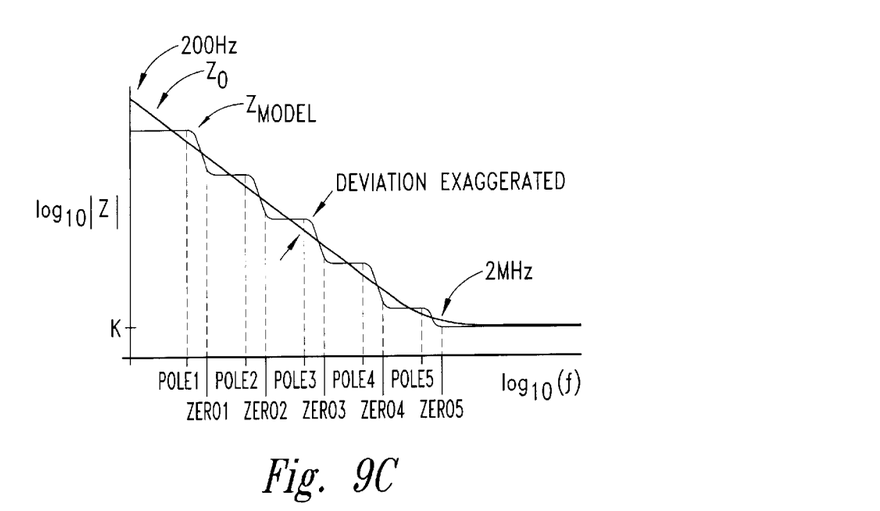

Here B is used to model the 100 ohm frequency response of Z(s) above approximately 1 MHz. A single pole will cause impedance to decrease with increase of signal frequency and a single zero will cause impedance to increase with increase of signal frequency as shown by FIG. 9C. Selection of particular poles and zeroes is made to decrease total overall deviation between the impedance model $Z_{model}$ and the generalized $Z_O$ impedance of twisted pair lines.

Figure 10A:
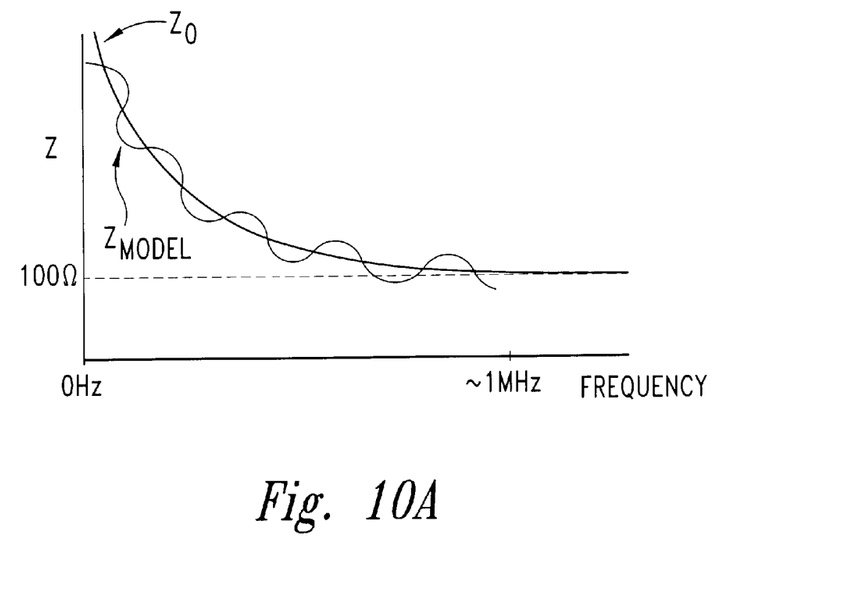
FIGS. 10A and 10B are impedance and phase plots, respectively, with respect to frequency of a signal applied to the twisted pair communication line further illustrating techniques to determine component values of the test apparatus embodiment of FIG. 6.
Figure 10B:
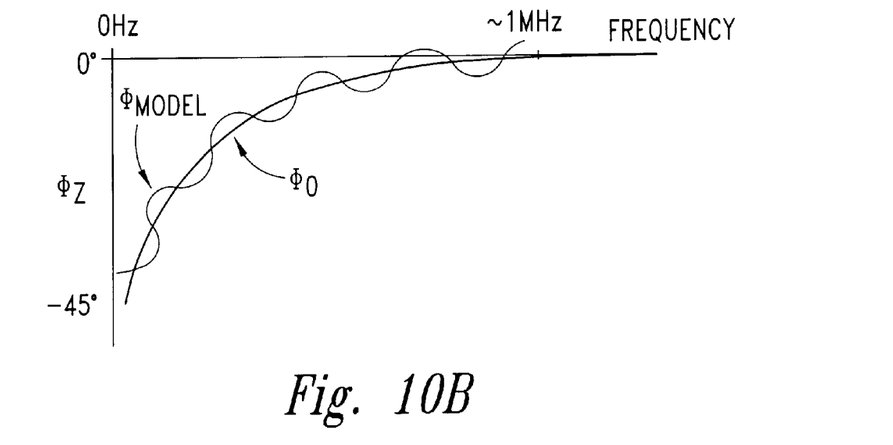
Figure 11:
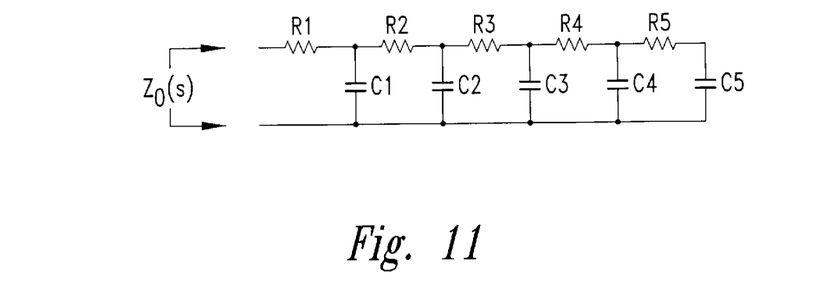
FIG. 11 is a schematic diagram of a circuit resulting from the techniques associated with FIGS. 8A–8B, 9A–9C, and 10A–10B.

Since the generalized impedance $Z_O$ represents typical impedance, some deviation between the impedance model $Z_{model}$ and the generalized impedance $Z_O$ is appropriate. Thus, the five pole and five zero impedance model shown in FIG. 9C has a sufficient number of poles and zeroes for most applications. Additionally, use of poles and zeroes to model magnitude of impedance has associated success in modeling the frequency response of the phase angle $\Phi_O$ of the general impedance $Z_O$ as shown in FIGS. 10A and 10B. After the poles and zeroes for Equation (1) have been determined, operations involving inverse Laplace Transforms are performed. An R-C circuit results such as the one shown in FIG. 11.

Figure 12A:
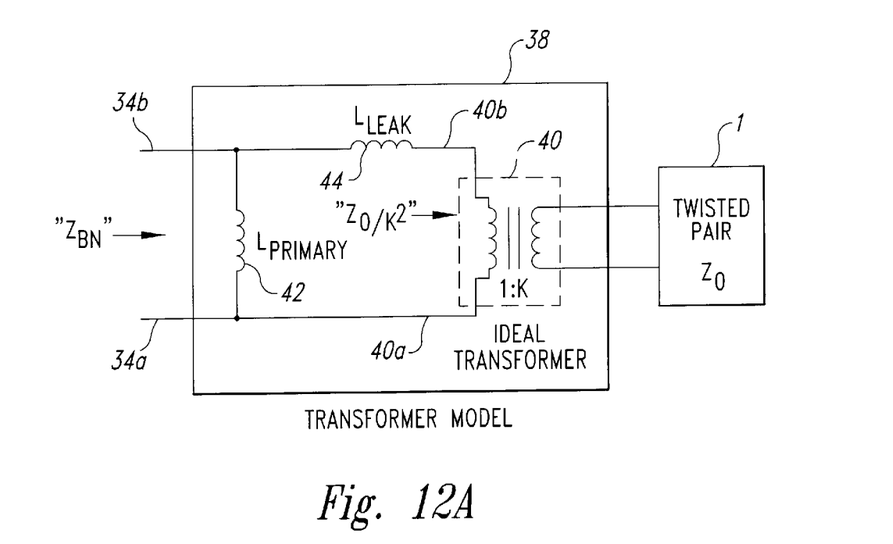
FIGS. 12A, 12B and 12C are partial block and partial schematic diagrams illustrating models used to determine component values of the test apparatus embodiment of FIG. 6.
Figure 12B:
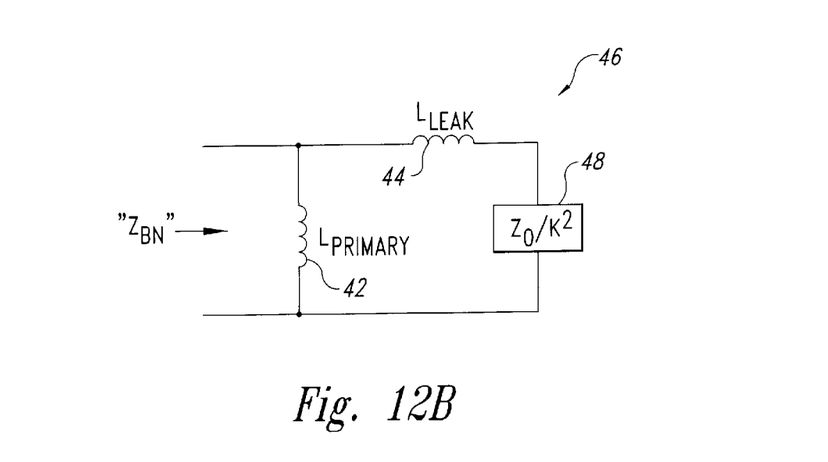
Figure 12C:
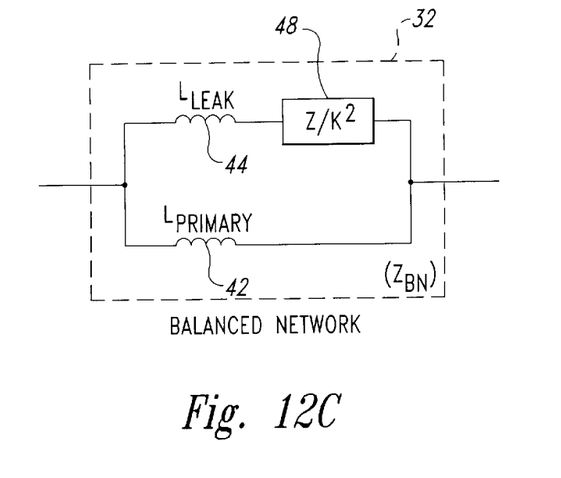
Figure 13:
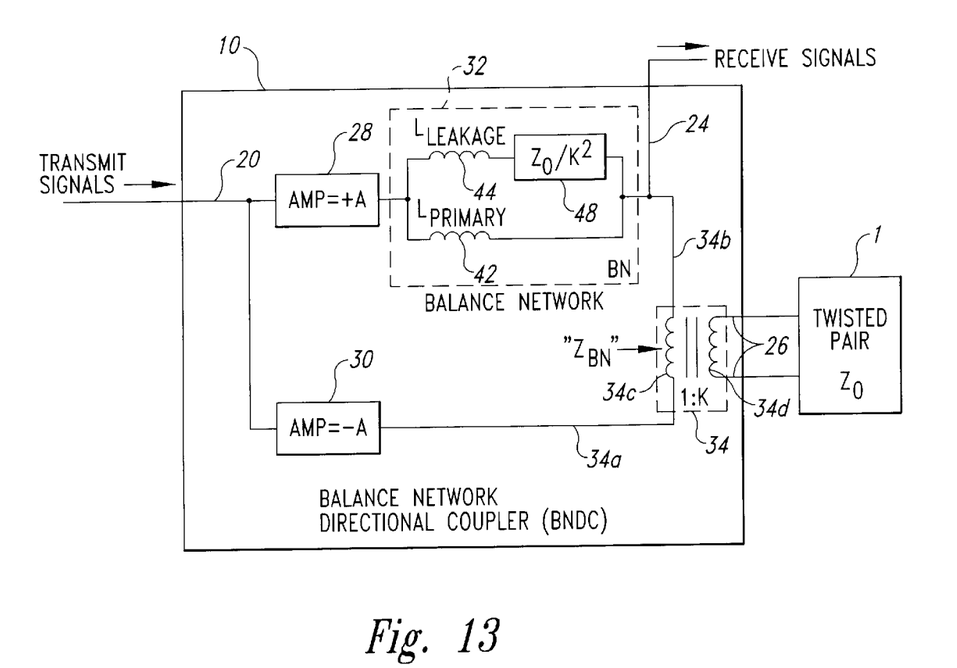
FIG. 13 is a partial block and partial schematic diagram illustrating further component detail of the test apparatus embodiment of FIG. 6.

For optimum performance of the BNDC 10, variations in the impedance of the transformer system 34 as a function of frequency must also be considered. These variations can be compensated for by additional circuitry included in the balance network 32, as explained below. A transformer model 38 having an ideal transformer 40 and associated primary coil inductance "$L_{PRIMARY}$" 42 and leakage inductance "$L_{LEAKAGE}$" 44 of the transformer 40 is shown in FIG. 12A. The transformer model 38 assists in determining the additional components of the balance network 32 needed to compensate for variations in the impedance of the transformer system 34 as a function of frequency. The $L_{LEAKAGE}$ inductance 44 represents leakage flux due to inefficiencies in typical transformer design and is determined by measurement. In other embodiments of the invention additional inductances are considered. The combined impedance $Z_{BN}$ of the transformer model 38 and the impedance $Z_O$ of the twisted pair line 1 at the terminals 34a,b can be transformed to an equivalent impedance model 46. The equivalent impedance 48 having a value of $Z_O/K^2$ represents the combined impedance of the ideal transformer 40 and twisted pair line 1 at the terminals 40a,b as shown in FIGS. 12A,B. A model of the equivalent impedance 48 is incorporated into the design of the balance network 32, as shown in FIG. 12C, and in the BNDC 10, as shown schematically in high level detail in FIG. 13. Thus, as the impedance of the transformer system 34 varies with frequency according to the value of $Z_O/K^2$, the impedance of the balance network 32 will also vary according to the value of $Z_O/K^2$. As a result, the BNDC 10 will continue to isolate the reception port 24 from the transmission port 20 as the frequency or frequency components of the signal generated by the transmitter varies.

Figure 14:
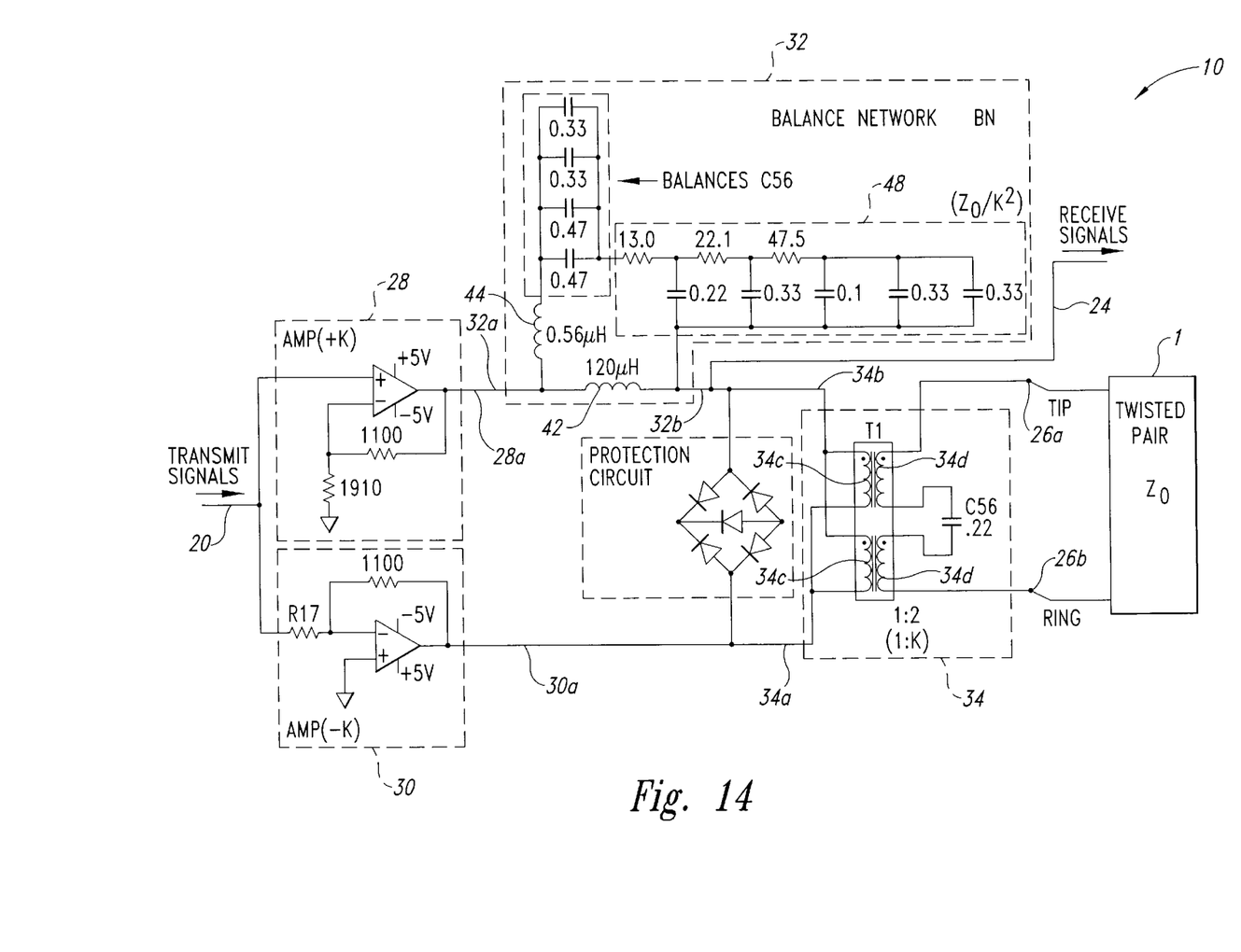
FIG. 14 is a schematic diagram illustrating one embodiment of the test apparatus embodiment of FIG. 13.

FIG. 14 illustrates one embodiment of the BNDC 10 in greater detail, including the components needed to compensate for variations in the impedance of the transformer system 34 and the impedance of the twisted pair line 1 as a function of frequency. As shown in FIG. 14, a three pole-three zero equation similar to Equation (1) is used to determine the resistance and capacitance values for the equivalent impedance 48 having a value of $Z_O/K^2$. The amplifiers 28 and 30 used in the depicted embodiment have output voltage ranges at amplifier outputs 28a and 30a of −4 to +4 volts. Operational amplifier model number 816 by Analog Devices is a representative example suitable for the depicted embodiment.

Since amplifier 30 inverts signals received at the transmission port 20 while amplifier 28 does not invert signals, the differential voltage between amplifier outputs 28a and 30a ranges from −8 to +8 volts having a 16 v peak to peak voltage. The resultant differential voltage across terminals 34a and 34b of the transformer system 34 will range from −4 to +4 volts having an 8 v peak to peak voltage. With the step-up ratio of K equal to 2 for the transformer system 34, the peak to peak differential voltage across tip 26a and ring 26b terminals will range from −8 v to +8 v with a 16 v peak to peak voltage. The BNDC 10 thus allows for significant strength of signals transmitted from communication line port 26 to the twisted pair line 1 while isolating these transmitted signals from signals received at the communication line port from the twisted pair line 1 to be sent to the reception port 24. The embodiment of FIG. 14 also exemplifies the transformer system 34 having additional electrical device, in this case capacitor C56 internally coupled to the second winding 34d. The balance network 32 has corresponding capacitance to balance capacitor C56.

Each of the circuit components whose function and interconnection is described in connection with FIGS. 5–7 and 11–14 is of a type known in the art, and one skilled in the art would be able to use such circuit components in the described combination to practice the invention. The internal details of these particular circuit components are not part of, nor critical to, the invention. Therefore, a detailed description of the internal operation of these circuit components is not required.

From the foregoing it will be appreciated that, although specific embodiments of the invention have been described herein for purposes of illustration, various modifications may be made without deviating from the spirit and scope of the invention. Accordingly, the invention is not limited except as by the appended claims.

It is claimed:

1. A balance network directional coupler comprising:
   a transmission port;
   a first amplifier having a first gain of one polarity, the first amplifier having an output terminal and an input terminal electrically coupled to the transmission port;
   a second amplifier having a second gain of a polarity opposite the polarity of the polarity of the first gain, the second amplifier having an output terminal and an input terminal electrically coupled to the transmission port;
   a reception port;
   a communication line port;
   a transformer system having first and second windings each having first and second terminals, the first and second terminals of the first winding being electrically coupled to the communication line port, the first terminal of the second winding being electrically coupled to the reception port, and the second terminal of the second winding being electrically coupled to the output terminal of the second amplifier, the second winding of the transformer system having an equivalent impedance at the first and second terminals based on an impedance of the transformer system and an impedance of a communication line, the transformer system comprising a dual core transformer; and
   a balance network having first and second terminals, the first terminal of the balance network electrically being electrically coupled to the output terminal of the first amplifier, the second terminal of the balance network being electrically coupled to the reception port, the balance network configured to have an impedance relative to the equivalent impedance at the second winding of the transformer system selected so that the reception port is substantially decoupled from the transmission port.

2. The balance network directional coupler of claim 1 wherein the ratio between the magnitude of the first gain to the magnitude of the second gain is substantially equal to the ratio of the impedance of the balance network to the equivalent impedance at the second winding of the transformer.

3. The balance network directional coupler of claim 2 wherein the first and second gains have the same absolute value, and the balance network is configured to have an impedance that is substantially equal to the equivalent impedance at the second winding of the transformer.

4. The balance network directional coupler of claim 1 wherein the impedance of the balance network is configured to include approximations comprising a primary inductance of the transformer system, a leakage inductance of the transformer system, and an ideal transformer electrically coupled to the communication line.

5. The balance network directional coupler of claim 1 wherein the impedance of the balance network is configured to include an R-C network approximation of the communication line.

6. The balance network directional coupler of claim 1 wherein the transformer system comprises a plurality of transformers.

7. The balance network directional coupler of claim 1 wherein the transformer system further comprises a capacitor internally coupled to the second winding.

8. A balance network directional coupler adapted for coupling to a communication line, the balance network directional coupler comprising:
  an input port;
  first and second amplifiers having gains of opposite polarity, the first and second amplifiers having respective output terminals and input terminals coupled to the input port;
  a reception port;
  a transformer system having a first winding coupled between the output terminal of the second amplifier and the reception port, and a second winding adapted for being electrically coupled to the communication line, the first winding of the transformer system having an equivalent impedance that is a function of the impedance of the transformer system and the impedance of any communication line coupled to the second winding, the transformer system comprising a plurality of transformers; and
  a balance network electrically coupled between the output terminal of the first amplifier and the reception port, the impedance of the balance network being selected such that the reception port is substantially decoupled from the input and is coupled to the second winding of the transformer system given the equivalent impedance of the first winding of the transformer system, and the gains of the first and second amplifiers.

9. The balance network directional coupler of claim 8 wherein the ratio between the magnitude of the gain of the first amplifier to the magnitude of the gain of the second amplifier is substantially equal to the ratio of the impedance of the balance network to the equivalent impedance of the first winding of the transformer system.

10. The balance network directional coupler of claim 8 wherein the magnitude of the gain of the first amplifier is substantially equal to the magnitude of the gain of the second amplifier, and the impedance of the balance network is substantially equal to the equivalent impedance of the first winding of the transformer system.

11. The balance network directional coupler of claim 8 wherein the transformer system comprises a single core transformer.

12. The balance network directional coupler of claim 8 wherein the absolute value of the gain of the first amplifier is substantially equal to the absolute value of the gain of the second amplifier.

13. A network system comprising:
  a communication network including a communication line;
  a communication line tester electrically coupled to the communication line of the communication network, the communication line tester comprising:
    a transmitter having an output terminal;
    a balance network directional coupler comprising:
      a transmission port electrically coupled to the output of the transmitter;
      a first amplifier having a first gain of one polarity, the first amplifier having an output terminal and an input terminal electrically coupled to the transmission port;
      a second amplifier having a second gain of a polarity opposite the polarity of the polarity of the first gain, the second amplifier having an output terminal and an input terminal electrically coupled to the transmission port;
      a reception port;
      a communication line port electrically coupled to the communication line;
      a first impedance system having first and second terminals, the first terminal of the first impedance system being electrically coupled to the output terminal of the first amplifier, the second terminal of the first impedance system being electrically coupled to the reception port, the first impedance system having a transformer system having first and second winding systems each having first and second terminals, the first and second terminals of the first winding system being electrically coupled to the communication line port, the first impedance system having first and second impedance portions, the first impedance portion being electrically coupled between the first terminal of the first impedance system and the first terminal of the second winding system, the second impedance portion being electrically coupled between the second terminal of the second winding system and the second terminal of the first impedance system, the second winding of the transformer system having an equivalent impedance at the first and second terminals based on an impedance of the transformer system and an impedance of the communication line; and
      a second impedance system having first and second terminals, the first terminal of the second impedance system being electrically coupled to the output terminal of the second amplifier, the second terminal of the second impedance system being electrically coupled to the reception port, the second impedance system having a balance network having first and second terminals and third and fourth impedance portions, the third impedance portion being electrically coupled between the first terminal of the second impedance system and the first terminal of the balance network, the fourth impedance portion being electrically coupled between the second terminal of the balance network and the second terminal of the second impedance system, the balance network configured to have an impedance relative to the equivalent impedance at the second winding of the transformer system, and impedances of the first, second, third, and fourth impedance portions selected so that the reception port is substantially decoupled from the transmission port.

14. The network system of claim 13 wherein the ratio between the magnitude of the first gain to the magnitude of the second gain is substantially equal to the ratio of the impedance at the first and second terminals of the first impedance system to the impedance at the first and second terminals of the second impedance system.

15. The network system of claim 14 wherein the first and second gains have the same absolute value, and the balance network is configured to have an impedance that is substantially equal to the equivalent impedance at the second winding of the transformer.

16. The network system of claim 13 wherein the communication line of the communication network comprises a twisted pair cable.

17. A balance network directional coupler comprising:
   a transmission port;
   a first amplifier having a first gain of one polarity, the first amplifier having an output terminal and an input terminal electrically coupled to the transmission port;
   a second amplifier having a second gain of a polarity opposite the polarity of the polarity of the first gain, the second amplifier having an output terminal and an input terminal electrically coupled to the transmission port;
   a reception port;
   a communication line port;
   a transformer system having first and second windings each having first and second terminals, the first and second terminals of the first winding being electrically coupled to the communication line port, the first terminal of the second winding being electrically coupled to the reception port, and the second terminal of the second winding being electrically coupled to the output terminal of the second amplifier, the second winding of the transformer system having an equivalent impedance at the first and second terminals based on an impedance of the transformer system and an impedance of a communication line, the transformer system comprising a plurality of transformers; and
   a balance network having first and second terminals, the first terminal of the balance network electrically being electrically coupled to the output terminal of the first amplifier, the second terminal of the balance network being electrically coupled to the reception port, the balance network configured to have an impedance relative to the equivalent impedance at the second winding of the transformer system selected so that the reception port is substantially decoupled from the transmission port.

18. The balance network directional coupler of claim 17 wherein the ratio between the magnitude of the first gain to the magnitude of the second gain is substantially equal to the ratio of the impedance of the balance network to the equivalent impedance at the second winding of the transformer.

19. The balance network directional coupler of claim 18 wherein the first and second gains have the same absolute value, and the balance network is configured to have an impedance that is substantially equal to the equivalent impedance at the second winding of the transformer.

20. The balance network directional coupler of claim 17 wherein the impedance of the balance network is configured to include approximations comprising a primary inductance of the transformer system, a leakage inductance of the transformer system, and an ideal transformer electrically coupled to the communication line.

21. The balance network directional coupler of claim 17 wherein the impedance of the balance network is configured to include an R-C network approximation of the communication line.

22. The balance network directional coupler of claim 17 wherein the transformer system further comprises a capacitor internally coupled to the second winding.

* * * * *